US009563850B2

(12) United States Patent
van Zwol et al.

(10) Patent No.: US 9,563,850 B2
(45) Date of Patent: Feb. 7, 2017

(54) METHOD AND INTERFACE FOR DISPLAYING LOCATIONS ASSOCIATED WITH ANNOTATIONS

(75) Inventors: Roelof van Zwol, Badalona (ES); Vanessa Murdock, Barcelona (ES); Lluís Garcia Pueyo, Sant Cugat del Vallès (ES)

(73) Assignee: Yahoo! Inc., Sunnyvale, CA (US)

( * ) Notice: Subject to any disclaimer, the term of this patent is extended or adjusted under 35 U.S.C. 154(b) by 881 days.

(21) Appl. No.: 12/686,677

(22) Filed: Jan. 13, 2010

(65) Prior Publication Data

US 2011/0173572 A1    Jul. 14, 2011

(51) Int. Cl.
*G06F 3/048* (2013.01)
*G06N 7/00* (2006.01)
*G06F 17/24* (2006.01)
*G06F 17/30* (2006.01)

(52) U.S. Cl.
CPC ............ *G06N 7/005* (2013.01); *G06F 17/241* (2013.01); *G06F 17/30241* (2013.01); *G06F 17/30268* (2013.01)

(58) Field of Classification Search
CPC  G06F 17/241; G06F 17/214; G06F 17/30241; G06F 17/30268; G06N 7/005
USPC ........................................................ 715/856
See application file for complete search history.

(56) References Cited

U.S. PATENT DOCUMENTS

| | | | |
|---|---|---|---|
| 7,945,852 B1 * | 5/2011 | Pilskalns ........... | G06F 17/30241 715/230 |
| 2004/0117358 A1 * | 6/2004 | von Kaenel et al. ............. | 707/3 |
| 2005/0108213 A1 * | 5/2005 | Riise et al. ....................... | 707/3 |
| 2006/0036588 A1 * | 2/2006 | Frank et al. ...................... | 707/3 |
| 2006/0149774 A1 * | 7/2006 | Egnor ........................... | 707/102 |
| 2007/0006098 A1 * | 1/2007 | Krumm et al. ................ | 715/825 |
| 2007/0011150 A1 * | 1/2007 | Frank ............................... | 707/4 |
| 2007/0110316 A1 * | 5/2007 | Ohashi .......................... | 382/195 |
| 2007/0198495 A1 * | 8/2007 | Buron et al. ...................... | 707/3 |
| 2007/0288164 A1 * | 12/2007 | Gordon .................. | G01C 21/20 701/469 |
| 2008/0010262 A1 * | 1/2008 | Frank ................................ | 707/3 |

(Continued)

*Primary Examiner* — Patrick Riegler
(74) *Attorney, Agent, or Firm* — Berkeley Law & Technology Group, LLP (57) ABSTRACT

Methods, systems and computer program products for displaying geographical locations with the one or more annotations. In a particular embodiment, a language model is used to obtain the probability distribution of the locations over one or more annotations. Further, the system and the method utilizes the probability data obtained from the language model to determine a probability score for each location over the one or more annotations. Subsequently, one or more geographical locations are displayed on a world map, based on the probability score of the geographical locations over the one or more annotations. In one embodiment, geographical locations may be highlighted using a color code on a heat map overlaid on the world map. The color code may represent the ranking of the geographical locations based on the calculated probability score for each identified geographical location. Further, when the user provides one or more additional annotations, the world map may be dynamically updated to display the relevant geographical locations associated with the updated annotations.

18 Claims, 8 Drawing Sheets

(56) References Cited

U.S. PATENT DOCUMENTS

| | | | |
|---|---|---|---|
| 2008/0010605 A1* | 1/2008 | Frank | G06F 17/30241 715/765 |
| 2008/0104019 A1* | 5/2008 | Nath | 707/3 |
| 2008/0189028 A1* | 8/2008 | Nair et al. | 701/200 |
| 2008/0204317 A1* | 8/2008 | Schreve et al. | 342/357.13 |
| 2008/0275869 A1* | 11/2008 | Herberger et al. | 707/5 |
| 2009/0132941 A1* | 5/2009 | Pilskalns et al. | 715/764 |
| 2009/0148816 A1* | 6/2009 | Marshall et al. | 433/223 |
| 2009/0160859 A1* | 6/2009 | Horowitz et al. | 345/440 |
| 2009/0222328 A1* | 9/2009 | Figueroa | G06Q 10/10 707/706 |
| 2009/0290812 A1* | 11/2009 | Naaman | G06F 17/30241 382/305 |
| 2009/0297118 A1* | 12/2009 | Fink | G06F 17/3082 386/278 |
| 2010/0023259 A1* | 1/2010 | Krumm | G01C 21/20 701/532 |
| 2010/0104187 A1* | 4/2010 | Broadbent | 382/176 |
| 2010/0205176 A1* | 8/2010 | Ji et al. | 707/737 |
| 2010/0211566 A1* | 8/2010 | Ghanekar et al. | 707/724 |
| 2010/0278453 A1* | 11/2010 | King | 382/321 |
| 2010/0287178 A1* | 11/2010 | Lambert et al. | 707/765 |
| 2011/0137895 A1* | 6/2011 | Petrou | G06F 17/30241 707/723 |

* cited by examiner

METHOD AND INTERFACE FOR DISPLAYING LOCATIONS ASSOCIATED WITH ANNOTATIONS

TECHNICAL FIELD

The present disclosure generally relates to display of one or more geographical locations, on a world map, associated with one or more annotations.

BACKGROUND

The internet has gradually evolved to offer a wide range of network services for online sharing and management of user generated content objects. Such network services allow a user to share and browse content objects such as multimedia content objects, audio content objects, visual content objects, and text content objects. Some examples of such services are Panoramio™, Blogger™ and Flickr™.

Network services are leading the growing enthusiasm for personal location awareness by allowing the user to spatially organize and browse their personal content objects. Users want to geo-tag their personal content objects and further represent the content objects on a world map. Geo-tagging is the process of attaching location information such as latitude and longitude coordinates to content objects. Geo-tagged content objects can be organized in taxonomy of major locations or pin-pointed on the world map to identify very small regions.

Due to the advent of GPS-enabled devices such as mobile phones and cameras, users can automatically associate the location information such as latitude and longitude with the content objects. However, for the users who do not own GPS enabled devices, geo-tagging is done by manually dragging the content object to a particular point on the world map displayed on a user interface. However, this process is time consuming and less accurate than automatic geo-tagging. Moreover, when manually geo-tagging the content object, network services simply display a world map or show the location of the last uploaded content object on the user interface.

Further, in some cases users append one or more annotations with the content objects. The annotations may be in the form of one or more tags, text, titles or description related to the content objects. Some of the existing solutions involve the extraction of textual or visual features from the annotations and/or content objects which are then modeled to determine the location information. However, these solutions are limiting as they assume the prior knowledge of the location through the information appended with the content objects and usually limit the scaling of the map by a few location granularities. Presently, the network services lack effective methods and systems to associate one or more locations with user generated content objects and present the associated locations automatically on the world map.

SUMMARY

In particular embodiments, the present invention provides methods, systems and computer program products for displaying geographical locations associated with one or more annotations. In a particular embodiment, a language model is used to obtain the probability distribution of the locations over one or more annotations. Further, the system and the method utilizes the probability data obtained from the language model to determine a probability score for each location over the one or more annotations. Subsequently, one or more geographical locations are displayed on a world map, based on the probability score of the geographical locations over the one or more annotations. In one embodiment, geographical locations may be highlighted using a color code on a heat map overlaid on the world map. The color code may represent the ranking of the geographical locations based on the calculated probability score for each identified geographical location. Further, when the user provides one or more additional annotations, the world map may be dynamically updated to display the relevant geographical locations associated with the updated annotations.

DETAILED DESCRIPTION

Various embodiments of the present invention will be described in detail below with reference to accompanying drawings. It will be apparent, however, that these embodiments may be practiced without some or all of these specific details. In other instances, well known process steps or elements have not been described in detail in order not to unnecessarily obscure the description of the invention. The following example embodiments and their aspects are described and illustrated in conjunction with apparatuses, methods, and systems which are meant to be illustrative examples, not limiting in scope.

Example Network Environment

Figure 1:
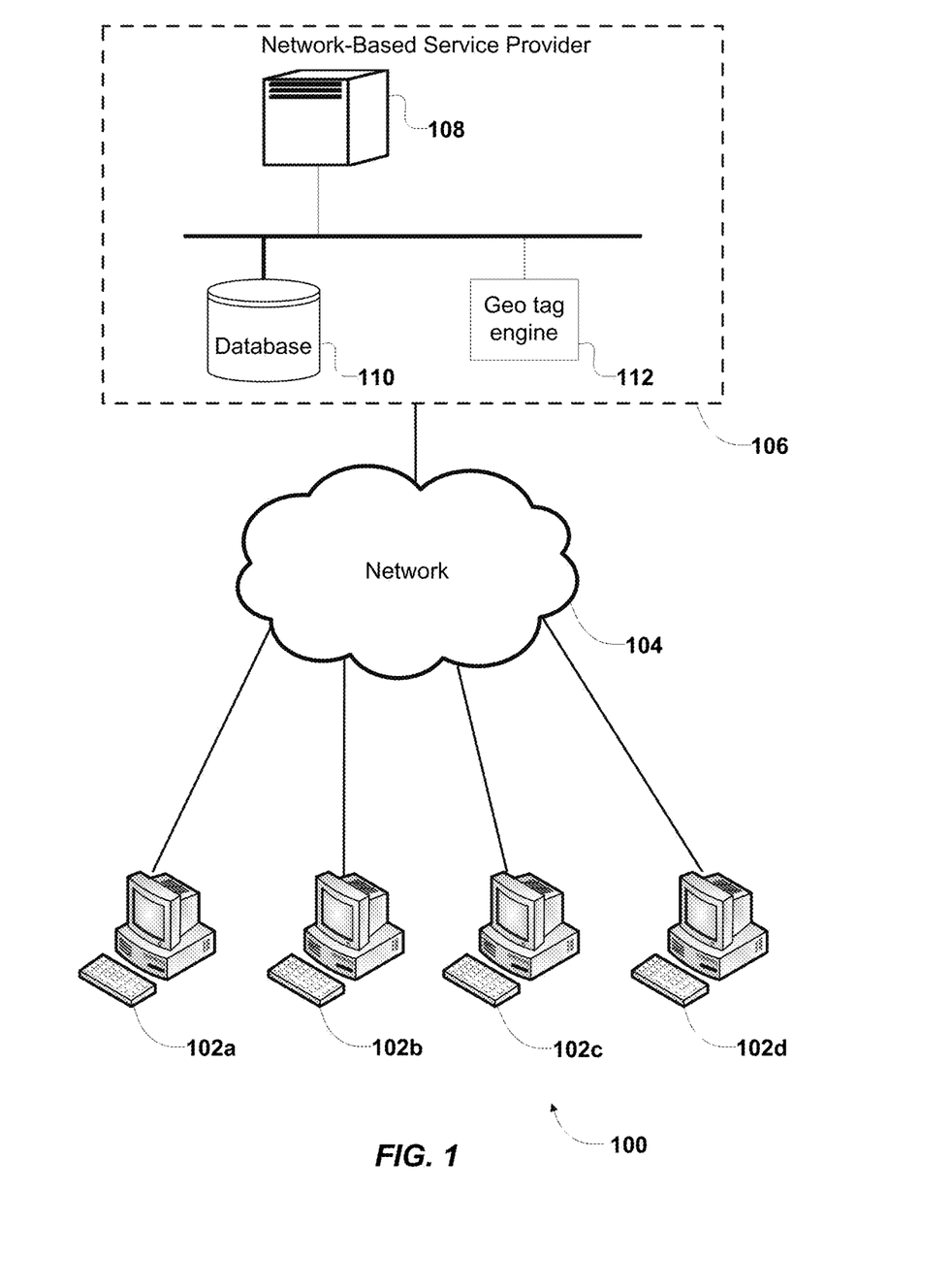
FIG. 1 illustrates an example of network environment in which particular implementations of the invention may operate.

FIG. 1 illustrates an implementation of a network environment 100 in which various implementations of the invention may be deployed, according to one embodiment. Network environment 100 includes a network-based service provider 106, a network 104, and one or more remote clients 102. Network 104 generally represents one or more interconnected networks, over which network-based service provider 106 and remote clients 102 can communicate with each other. Network 104 may include packet-based wide area networks (such as the Internet), local area networks (LAN), wide area networks (WAN), private networks, wireless networks, satellite networks, cellular networks, paging networks, cable networks and the like. A person skilled in the art will recognize that network 104 may also be a combination of more than one type of network. For example, network 104 may be a combination of a LAN and the Internet. In addition, network 104 may be implemented as a wired network, or a wireless network or a combination thereof. Remote clients 102 are communicatively coupled to network 104 via a network service provider or any other suitable methods known in the art.

Remote Clients

Remote clients 102 are computing devices from which a user accesses the services provided by network-based service provider 106. Client node 102 has the capability to communicate over network 104. Client node 102 further has the capability to provide the user an interface to interact with the service provided by network-based service provider 106. Client node 102 may be, for example, a desktop computer, a laptop computer, a server, a workstation, an Internet appliance, a mobile communication device, a personal digital assistant, and the like. A client node may execute one or more client applications such as, without limitation, a web browser to access and view content objects over a computer network, an email client to send and retrieve emails and an instant messaging client for communicating with other users. Remote clients 102, in various embodiments, may include a Wireless Application Protocol (WAP) browser or other wireless or mobile device protocol suites such as, without limitation, NTT DoCoMo's i-mode wireless network service protocol suites, EDGE, and the like.

Network-Based Service Provider

Network-based service provider 106 is a network addressable system that hosts a network application accessible to one or more users over network 104. The network application may provide means for users to connect with each other through social ties or any other common attribute. The network application may be an email service, a social or a business network, a blog service, an online forum, a wiki service, a content distribution service or any other network application where at least part of the content is generated by users. Some examples of such services are Panoramio™, Flickr™, Answers™, Orkut™ and Twitter™. In various embodiments of the present invention, network-based service provider 106 includes an application server 108, a database 110, and a geo tag engine 112. Further, it should be understood that database 110 may be any source of information such as a hosting service or remote database, and network-based service provider 106 can either be connected directly thereto or through network 104. In an embodiment of the invention, database 110 may be associated with a content storage server.

Application server 108 provides a user access to database 110 and network applications over network 104. More specifically, user executes a client application and accesses one or more network applications provided by network-based service provider 106. Further, user may access the content objects stored in database 110 via network applications. Additionally, application server may employ a user authentication system such as a login and a password to provide access to content objects stored in database 110.

Database 110 stores the content generated by users of network application hosted by network-based service provider 106. Database 110, without limitation, may include information which is accessible or viewable by the users of network 104. Content stored in database 110 includes content objects such as, but not limited to, multimedia content objects, audio content objects, text content objects and visual content objects. Further, the user may append one or more annotations, and/or location metadata associated with the content objects in database 110. Annotations may include, but not limited to, one or more tags, a title, a description, creator, comments and the like. Additionally, the content may also include annotations embedded by various digital devices. For example, a digital camera may embed various annotations in the picture. The various annotations may represent time of capture, aperture, shutter speed, location metadata and the like. Such annotations may be extracted, for example, from the EXIF (Exchangeable Image File) header, or from the IPTC (International Press Telecommunications Council) header stored inside the digital file of the picture by various photograph management and organization software packages. In various embodiments of the present invention, the user may also edit the annotations associated with a particular content object at any give time.

Geo tag engine 112 determines the probable locations associated with one or more annotations provided by the user. Geo tag engine 112 includes a language model to derive a model of each location based on the annotations. The modeling of locations is further utilized to determine the probable locations associated with the annotations. Determined locations are presented to the user on an interface provided by application server 108. The interface provides an interactive way to visualize the locations on a world map corresponding to the annotations provided by the user.

Figure 2:
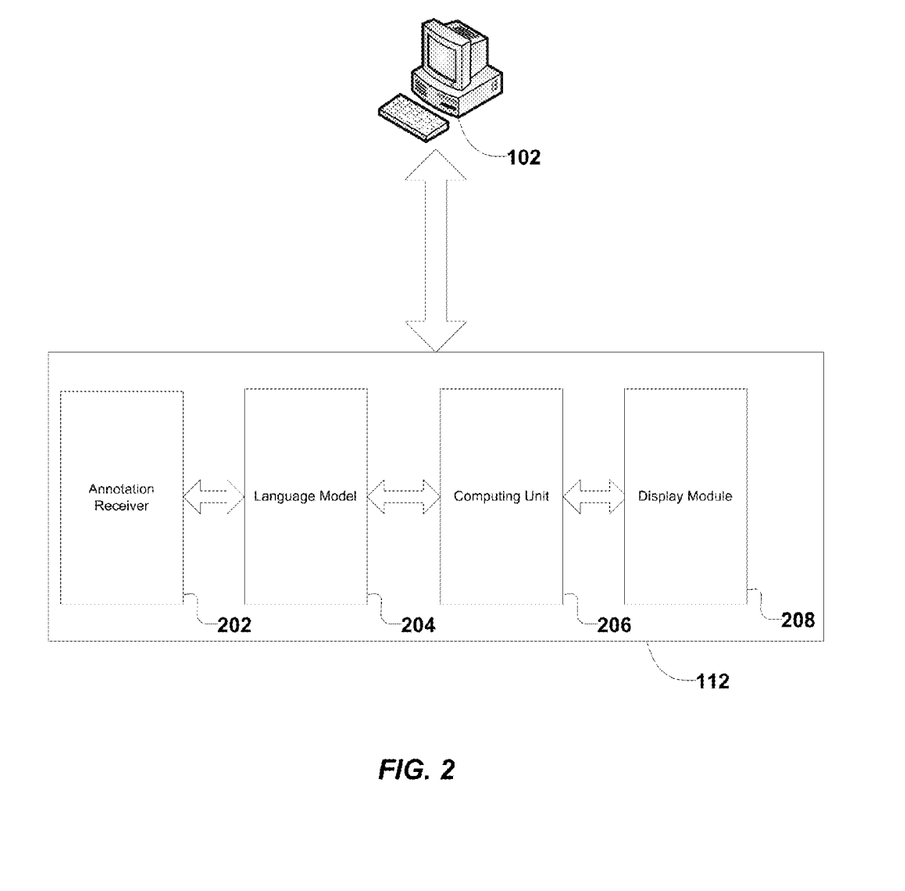
FIG. 2 is a block diagram of geo tag engine in an example embodiment of the present invention.

FIG. 2 illustrates the geo tag engine 112 in an embodiment of the present invention. In an embodiment of the present invention, geo tag engine 112 may include an annotation receiver 202, a language model 204, a computing unit 206 and a display module 208. Annotation receiver 202 may receive one or more annotations from one or more remote clients 102. The annotations may include, but not limited to, one or more tags, a title, a description, creator, comments and the like. In one embodiment, the annotations may be associated with user generated content objects. The content objects may include, but not limited to, a multimedia content object, an audio content object, a text content object and a visual content object. In another embodiment of the present invention, the annotations may be one or more keywords of a search query.

Annotation receiver 202 may communicate with language model 204 to identify one or more geographical locations that may be associated with the received annotations. In one embodiment, language model 204 may be developed by geo tag engine 112. Language model 204 may be developed by utilizing the various annotations and location metadata associated with the content objects stored in database 110. In one embodiment, location metadata associated with the content objects is latitude and longitude coordinates of a location. For developing language model 204, content objects stored in database 110 may be divided into two categories: a) content objects with one or more annotations and associated location metadata and b) content objects with one or more annotations but no location metadata. The content objects with one or more annotations and associated location metadata is interchangeably referred to as a training data set. In an embodiment of the present invention, language model 204 may access the location metadata of the training data set from database 110. Since, the training data set has content objects associated with one and more annotations, and specific location metadata, language model 204 may use the latitude and longitude coordinates (location metadata) to represent a location on the world map. In an embodiment of the present invention, for representing locations on a map, an m×n grid may be constructed on the world map. The grid construction is based on the latitude and longitude coordinates of the globe, where each cell within the grid represents a location on the world map. In another embodiment, locations may be represented by bounding boxes overlaid on the world map.

Language model 204 may associate the represented location with corresponding annotations to generate a language representation of each location. In one embodiment of the present invention, annotations associated with the geographical locations on the world map may be enriched by using external sources of information such as gazetteers and Geonames. Language model 204 may utilize the language representation of locations to determine the probability distribution of locations over the annotations. For each location, the probability of an annotation to be present in the set of annotations associated with the location may be determined and the probability data (probability distribution of locations) may be stored in language model 204.

Probabilistic Distribution of Locations Over Annotations

In an example embodiment of the present invention, the probability distribution of locations over the annotations is represented by P(T|L), where T is a set of annotations T={t1, t2, . . . ti} and L is the set of locations containing all the locations on the world map. In one embodiment, each annotation $t_i$ present in the set T is generated independently, thus $$P(T \mid L) = \prod_{i=1}^{|T|} P(t_i \mid L) \qquad (1)$$

Further, the probability distribution of locations for each annotation (i.e. $P(t_i|L)$) is stored in a lookup database in language model 204.

A person who is ordinarily skilled in the art may appreciate that the mathematical model shown in the application is just an exemplary method to compute the probability distribution of locations and does not limit the scope of the invention. Various other mathematical/probabilistic models may be used to compute the probability distribution of locations over annotations.

In various embodiments, the probability data computed by language model 204 may suffer from the problem of data sparseness or that the annotations indicate an area that exceeds the bounds of a location. For example, some annotations specify a large area such as a country or a continent, which may be larger than the largest grid cell used in the representation of locations. Moreover, some content objects and related annotations may be associated with several locations on the grid thereby exceeding the bounds of specific location. In some embodiments, prior to storage, the probability distribution of locations over the annotations may be smoothed using various methods of smoothing such as, but not limited to, annotation based smoothing with neighbors, cell based smoothing, spatial ambiguity aware smoothing and an external knowledge base of locations.

Annotation Based Smoothing with Neighbors

Due to the problem of data sparseness, probability distribution of locations over the annotations may not contain probability values for each location. Thus, based on the annotations associated with the locations in the spatial neighborhood, the probability distribution of locations over the annotations is smoothed. In one example embodiment, each annotation found within a specific location is generated by either language model of the location, or by language models of neighboring locations, thus the annotation likelihood (the probability of a tag given a location expressed as P(t|L)) may be calculated by the equation:

$$P(t \mid L) = \mu \frac{|L| \cdot P(t \mid L)_{ML}}{|L| + \lambda} + (1 - \mu) P(t \mid NB(L)) + \frac{\lambda \cdot P(t \mid G)_{ML}}{|L| + \lambda} \qquad (2)$$

$$P(t \mid NB(L)) = \sum_{L' \in NB(L)} \frac{|L'|}{|L'| + \lambda} \frac{P(t \mid L')_{ML}}{(2d+1)^2 - 1} \qquad (3)$$

where P(t|G) is the maximum likelihood probability of a tag being generated by a general model of locations, and λ and µ are parameter that control the smoothing to prevent zero probabilities for tags not seen in the data. The neighborhood of locations, NB(L), consists of all locations, L', within distance d (in grid cells) of location L to be connected on the grid.

Smoothing Cell Relevance Probabilities

In another example embodiment, cell based smoothing is used to smooth a grid cell from its neighborhood locations. In this method, cell relevance propagates through the links between locations which are close on the grid structure. Using this, a weighted in-degree approach is used to calculate the probability to generate the annotation set T of a certain location by adding the probabilities of neighborhood locations $$P(T \mid L) = \mu \cdot P(T \mid L) + (1 - \mu) \sum_{L' \in NB(L)} \frac{P(T \mid L')}{(2d+1)^2 - 1} \qquad (4)$$

Boosting Geo-Related Annotations

In yet another example embodiment, an external database of locations is used to incorporate geographical information about geo-related annotations. In some cases, users annotate content with annotations that can be easily recognized as location specific such as names of places (e.g. cities or countries), points-of-interest (e.g. monuments, stadiums, hotels, or bars) or events specific to certain locations (e.g. festivals, sport competitions). A boosting approach defined by the following equation may be used to introduce preliminary knowledge about annotations into the developed model.

$$P^*(t \mid L)_{ML} = P(t \mid L)_{ML} \frac{1 + \beta \cdot P(Loc \mid t)}{Z} \qquad (5)$$

where P(Loc|t) is a probability of the annotation t to be location specific, β is a boosting coefficient, Z is a normalization constant, and $P(t|L)_{ML}$ is defined as in equation 2.

For example, an external database of locations such as GeoNames may be used to identify location specific annotations. GeoNames is a geographical database integrating geographical data such as names of places in various languages, elevation, population and other data from various sources. The list of toponyms limited to English names of populated locations is used for identifying location specific annotations. For all annotations that are present in the list, P(Loc|t) equals 1.0 and otherwise equals 0.

Spatial Ambiguity-Aware Smoothing

In yet another example embodiment, spatial ambiguity of an annotation is incorporated in language model 204 for cases where annotations are specific to more than one location. Annotations can be specific to more than one location either because their scope exceeds the bounds of a single cell or due to their ambiguity (for example bath and Bath, UK) or because they are instances that are typically spotted at a few specific locations, such as elephants. For smoothing purposes, annotations that are highly spatially ambiguous are often better than those having a single geographical focus. As the latitude and longitude coordinates of all annotations are known in the training data set, spatial ambiguity of an annotation is characterized by the standard deviation of its latitudes and longitudes $\sigma_{lat}$, $\sigma_{lon}$. This can be incorporated in the developed language model 204 by using the smoothing coefficient $\lambda$ discussed earlier, in equation 3. In this case, smoothing coefficient $\lambda$ is annotation specific and proportional to the ambiguity of an annotation.

$$\lambda = \lambda + \gamma(\sigma_{lat}(t) + \sigma_{lon}(t)) \qquad (6)$$

Thus, individually generated probabilities of ambiguous annotations are used for finding the most probable location for a set of annotations. Also, it helps in preventing over-boosting of ambiguous annotations.

A person who is ordinarily skilled in the art may appreciate that the various probabilistic models shown in the application for smoothing are for exemplary purposes only and do not limit the scope of the invention. Various other mathematical and/or probabilistic models may be used for smoothing of the probabilistic distribution of locations.

In one embodiment, computing unit 206 may obtain the probability distribution of locations corresponding to the one or more annotations from language model 204. Computing unit 206 may utilize the probability data obtained from language model 204 to compute a probability score for each location corresponding to the annotations. The probability score of the location signifies its probability of being associated with the annotations. In one embodiment, computing unit 206 may generate a rank list of locations, ordered by the descending probability scores. Subsequently, geo tag engine 112 may generate a rank list of locations based on the one or more annotations received from the user. In other words, a rank list of locations L, ordered by the descending probability for a given set of annotations T belonging to the content, taken within the bounds of L is generated by the equation:

$$P(L \mid T) = \frac{P(T \mid L)P(L)}{P(T)} \qquad (7)$$

where P(L|T) represents the probability of the locations L for the set of annotations T. In one embodiment, a multinomial probability distribution over the annotations is used to represent the locations. In various embodiments, probability of locations P(L) and probability of annotations P(T) may not influence the ranking of locations. The rank list of locations for the given set of annotations (i.e. P(L|T)) is obtained by computing the probability of the given set of annotations at the locations (i.e. P(T|L)). Thus, locations are ranked by the probability to generate the set of annotations supplied by the user. If each annotation $t_i$ in the set T is generated independently, the annotation set likelihood can be calculated by the equation:

$$P(t \mid L) = \frac{|L|}{|L| + \lambda} P(t \mid L)_{ML} + \frac{\lambda}{|L| + \lambda} P(t \mid G)_{ML} \qquad (8)$$

where $P(t|L)_{ML}$ and $P(t|G)_{ML}$ are maximum likelihood estimates of annotation generation probabilities for the location and for the global language models, |L| is the size of the location L in annotations and $\lambda$ is the parameter of smoothing. In an example embodiment of the present invention, Dirichlet smoothing may be used for better estimation of probabilities.

Visualizing Locations on World Map

In one embodiment, display module 208 may communicate with computing unit 206 to receive the ranking list of the geographical locations over the one or more annotations. Subsequently, display module 208 may transmit user interface data operative to cause the remote client applications to represent the locations over the world map. In one embodiment, the geographical locations may be represented with an associated numerical ranking to represent the probability score of the location associated with the annotations. In various embodiments, for representing locations on a map, an m×n grid may be constructed on the world map. The grid construction is based on the latitude and longitude coordinates of the globe, where each cell within the grid represents a location on the world map. In another embodiment, locations may be represented by bounding boxes laid over the world map.

In another embodiment, remote client applications may represent the geographical locations on a heat map overlaid on the world map. Heat map is a graphical representation of data where the values taken by a variable in a two-dimensional map are represented as colors. A color may be assigned to each location, based on the probability score associated with the location that represents the probability of that location being associated with the one or more annotations. Thus, the color code defines a ranking of geographical locations identified by geo tag engine 112. In various embodiments, the world map may automatically select an appropriate zoom level to display the geographical locations.

In some embodiments, the user may provide one or more additional annotations. The additional annotations may be combined with the annotations provided earlier by the user to generate an updated set of annotations. Language model 204 may be used to obtain the probabilistic data corresponding to the updated set of annotations. Computing unit 206 may apply the probabilistic modeling on the obtained probabilistic data to identify the geographical locations corresponding to the updated set of annotations. Display module 208 may display the identified geographical locations on the world map. In one embodiment, display module 208 may highlight the identified geographical locations on the world map. In one embodiment, the world map may automatically zoom in on the relevant area of the world corresponding to the updated set of annotations. In various embodiments, when the user annotates a content object, visualization of locations on the world map may encourage the user to add more annotations to the content object. Also, in case of additional annotations, the display module may change the zoom level of the world map accordingly to display the geographical locations. The dynamic adjustment of the world map with the annotations helps the user in accurately geo-tagging content objects.

In some embodiments, the annotations received from the user are one or more keywords of a search query. Geo tag engine 112 may utilize language model 204 to identify the geographical locations associated with the keywords of the search query. Display module 208 may then cause the remote client applications to display the identified geographical locations on the world map. In one embodiment, display module 208 may highlight the identified geographical locations on the world map. In various embodiments, user may browse content objects associated with the highlighted locations. In one embodiment, user may select a highlighted location by a mouse-over on it. In another embodiment, user may select a highlighted location by a mouse click on it. A representative content object of the selected highlighted location may be shown to the user. Thus, user is allowed to browse content objects associated to a location, with respect to their query.

In one embodiment, annotations received from the user may be associated with one or more content objects. Geo tag engine 112 may receive the annotations from the user and generates a ranking list of locations that may be associated with the content object. The list of locations is presented to the user on the world map displayed on an interface. The user may then select a location from the displayed locations for association with the content object. Thus, the user is allowed to geo tag the content object by associating a location with the content object. This embodiment is explained in detail in conjunction with FIG. 3.

In another embodiment, annotations received from the user may be associated with one or more keywords of a search query. Geo tag engine 112 receives the annotations from user and generates a ranking list of geographical locations that may be associated with the query. The list of geographical locations is presented to the user on the world map. Thus, user is allowed to visualize locations associated with the content objects. Further, a representative content object may also be displayed to the user when a user performs at least a mouse-over or a mouse click on the location. Thus, the user is allowed to browse the content objects associated with the displayed locations. This embodiment is explained in detail in conjunction with FIG. 4.

Figure 3A:
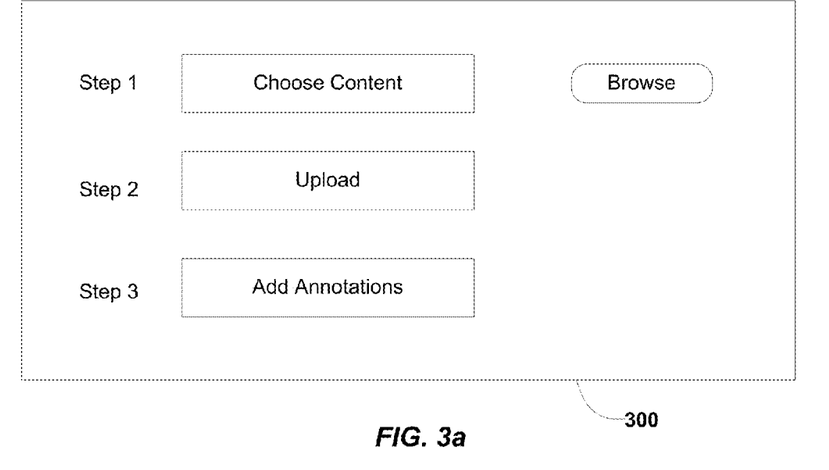
FIG. 3a, FIG. 3b and FIG. 3c illustrate an example embodiment of the present invention to display geographical locations associated with one or more annotations.
Figure 3B:
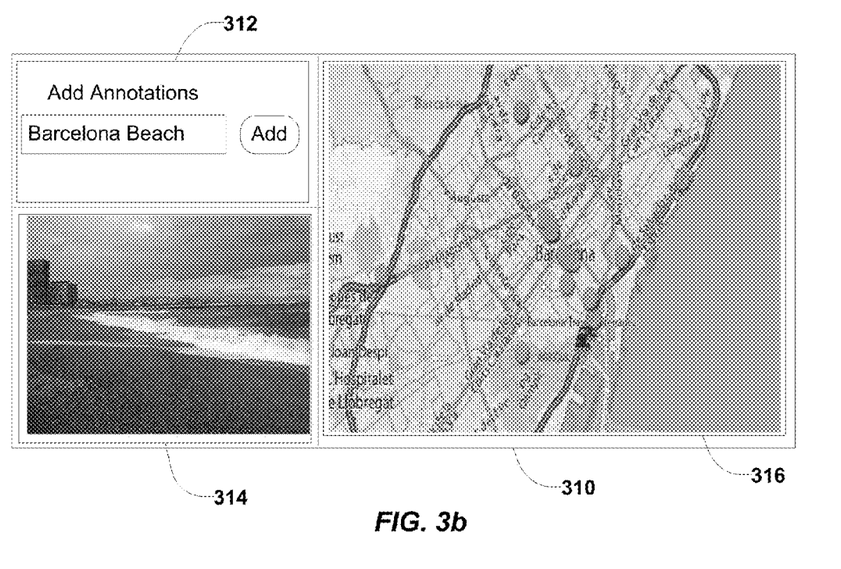
Figure 3C:
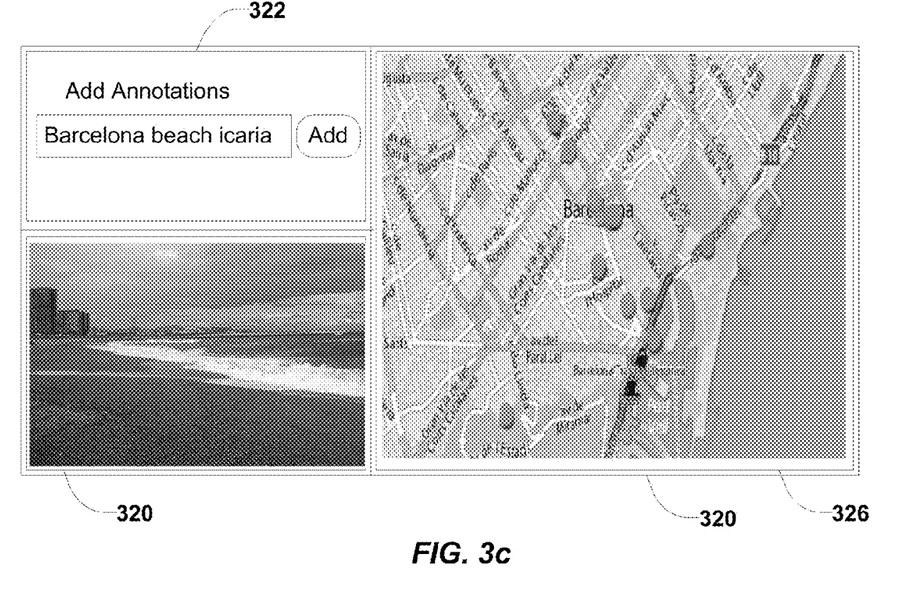

FIGS. 3a, 3b, and 3c, collectively, illustrate a user interface for geo-tagging one or more content objects in an example embodiment of the present invention. Referring to FIG. 3a, an example screen 300 is shown for uploading one or more content objects including one or more annotations. As shown in the example embodiment, the user can upload the content object in three steps. In step 1, the user may select one or more content objects, residing in the client node 102, by means of the browse button. In step 2, the user may upload the selected content object and subsequently, in step 3, the user may add one or more annotations to the content object. A person ordinarily skilled in the art may appreciate that any other method of uploading the content object may be utilized without departing from the spirit and scope of the present invention.

In the example embodiment of the present invention, the user uploads a photo and provides corresponding annotations such as "Beach" and "Barcelona" with the photo. Now referring to FIG. 3b, the application server 108 provides an example screen 310 for viewing the locations associated with the annotations provided by the user. The screen 310 may include an annotation pane 312, a content object viewing pane 314, and a map viewing pane 316. Annotation pane 312 displays the annotations provided by the user. The uploaded photo is shown in the content object viewing pane 314. The map viewing pane 316 shows a world map, automatically zoomed in to an appropriate level, to display locations associated with the annotations. In the example embodiment, locations may be displayed on the world map with a numerical rank attached to each location. The numerical rank signifies the probability of the location to associate with the annotations provided by the user. In another embodiment, locations may be displayed on a heat map overlaid on the world map, where different color signifies the ranking of the locations. In one embodiment, the ranking of the locations are based on the probabilistic score of the locations derived from computing unit 206. Thus, user is allowed to view the probable locations corresponding to the annotations. This may provide the flexibility to the user to geo-tag the photo. Moreover, visualization of geographical locations on the world map corresponding to the one or more annotations encourages the user to add more annotations to the photo, to accurately geo-tag the photo.

Referring to FIG. 3c, an example screen 320 shows the change in the display of the world map on addition of one or more annotations. The screen 320 may include an annotation pane 322, a content object viewing pane 324, and a map viewing pane 326. In this example, the user adds annotation "icaria" with the photo. Annotation pane 322 displays the annotations provided by the user. The uploaded photo is shown in the content object viewing pane 324. The map viewing pane 326 shows the world map to display locations associated with the annotations. Addition of annotation "icaria" may result in updating the locations shown on the world map presented on the example screen 320. For example, locations around the "icaria" beach in Barcelona, Spain are now present in the updated locations. Also, the world map may change the zoom level accordingly to display the updated locations. The dynamic adjustment of the world map with the annotations may help the user in accurately geo-tagging the content object.

Figure 4A:
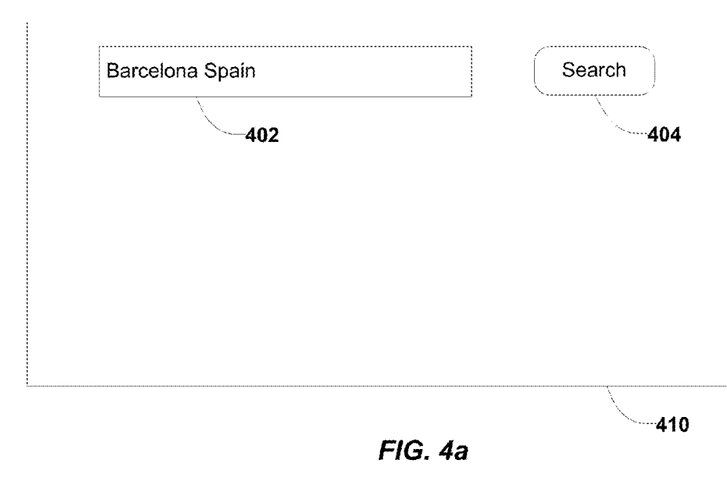
FIG. 4a, FIG. 4b and FIG. 4c illustrate an example embodiment of the present invention to display geographical locations associated with one or more annotations provided in a search query.
Figure 4B:
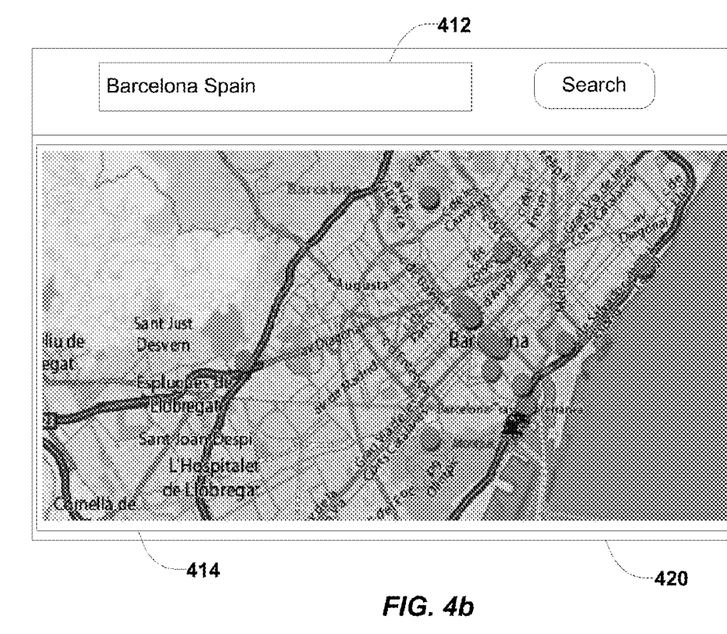
Figure 4C:
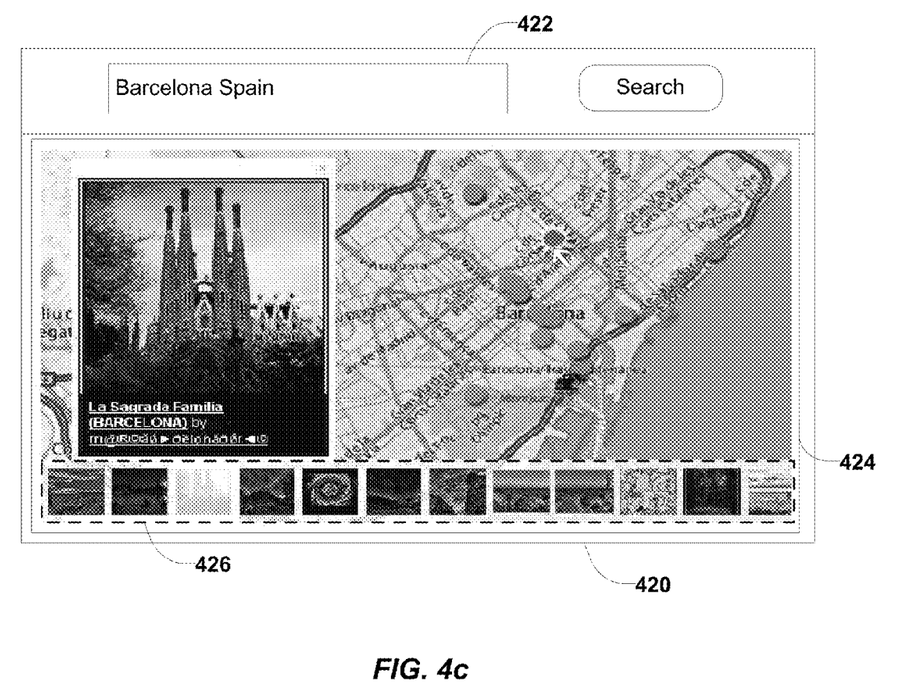

FIGS. 4a, 4b, and 4c, collectively, illustrate user interface for displaying the results of a search query provided by the user in an example embodiment of the present invention. Referring to FIG. 4a, an example screen 400 is shown for providing one or more keywords of the search query. The screen 400 may include a search field 402 for entering one or more keywords. In the example embodiment, the user enters a query "Barcelona Spain" in the search field 402. A button, icon, or other actuable element 404 (e.g., the "Find" button) may be provided to allow the user to initiate the search for the query, although pressing an "enter" key on the keyboard or other techniques may also be used to initiate the search. Based on the keywords of the search query, a set of locations is identified and presented to the user on a world map.

FIG. 4b shows an example screen 410 for viewing the locations associated with the annotations provided by the user. The screen 410 may include a search field 412 and a map viewing pane 414. Search field 412 displays the keywords of the search query entered by the user. The map viewing pane 414 shows a world map with the highlighted locations. The world map may automatically zoom in to an appropriate level, to display locations associated with the keywords of the search query. In one embodiment, locations may be displayed on a heat map overlaid on the world map. In another embodiment, locations may be displayed on the world map with a numerical rank attached to each location. The numerical rank signifies the probability of each location to be associated with the keywords provided in the search query. Thus, the user may be allowed to view the probable locations corresponding to the query. Further, user may also browse content objects associated with the displayed locations while searching.

FIG. 4c shows an example screen 420 for browsing content objects associated with the highlighted locations displayed on the world map. The screen 420 may include a search field 422, a content object viewing pane 424 and a map viewing pane 426. A highlighted location on the world map may be selected by the user by a mouse-over or a mouse click on the location displayed. A representative image of the selected highlighted location may be shown to the user. Further, one or more content objects associated with the selected highlighted location are presented to the user on the content object viewing pane 424. Thus, the user is allowed to browse content objects associated with a location.

Figure 5:
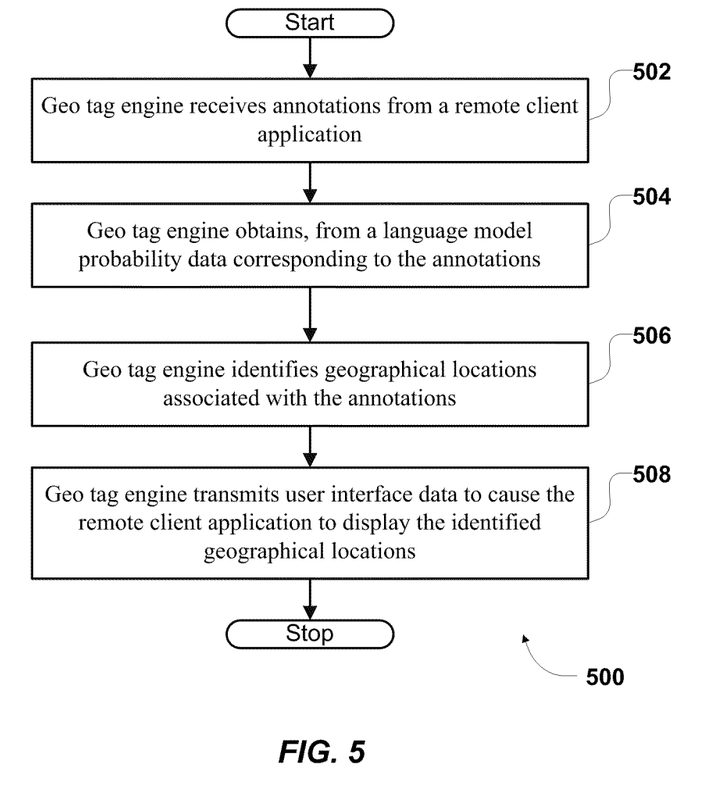
FIG. 5 is a flowchart illustrating an example method for displaying one or more geographical locations associated with the one or more annotations.

FIG. 5 illustrates the flowchart 500 summarizing various operations involved in an example embodiment of the invention. At step 502, annotation receiver 202 receives one or more annotations from one or more remote clients 102. In one embodiment, annotations may be associated with a content object uploaded by the user. The content object uploaded by the user may include, without limitation, a multimedia content object, a visual content object, an audio content object and a text content object. In another embodiment, annotations may be one or more keywords of a search query entered by the user.

At step 504, computing unit 206 obtains, from language model 204, probabilistic data corresponding to the one or more annotations. In one embodiment, the probabilistic data may correspond to a probability distribution of one or more geographical locations over the one or more annotations. In one embodiment, language model 204 may be developed by geo tag engine 112. Language model 204 may be developed by utilizing the content objects and associated annotations and location metadata stored in database 110. In one embodiment, location metadata associated with the content object may be latitude and longitude coordinates of a location.

At step 506, computing unit 206 applies probabilistic modeling to identify one or more geographical locations associated with the one or more annotations. In one embodiment, the probabilistic modeling is based on the probabilistic data received from language model 204. Further, a list of geographical locations may be generated based on their probability of being associated with the annotations.

At step 508, display module 208 may transmit user interface data operative to cause the remote application clients to display one or more identified geographical locations on the world map. In various embodiments, display module 208 may highlight the identified geographical locations on the world map. In various embodiments, for representing locations on a map, an m×n grid may be constructed on the world map. The grid construction is based on the latitude and longitude coordinates of the globe, where each cell within the grid represents a location on the world map. In another embodiment, locations may be represented by bounding boxes laid over the world map. In one embodiment, the locations may be displayed on the world map and are given a numeric ranking based on their probability of being associated with the annotations. In another embodiment, the locations may be assigned a color code based on their probability and displayed on a heat map overlaid on the world map. In one embodiment, the world map may automatically zoom in to an appropriate level showing only the relevant area of the map for the given annotations. In some embodiments, visualization of locations on the user interface may help a user in geo-tagging the content object.

In various embodiments, the user may provide one or more additional annotations. The additional annotations are combined with the annotations earlier provided by the user to generate an updated set of annotations. Geo tag engine 112 may identify the geographical locations corresponding to the updated set of annotations. Display module 208 may cause the remote client applications to display the identified geographical locations on the world map. In one embodiment, display module 208 may highlight the identified geographical locations on the world map. In one embodiment, the world map may automatically zoom in on the relevant area of the world corresponding to the updated set of annotations. In another embodiment, the geographical locations may correspond to the results of a search query entered by the user. A representative content object of each geographical location may be displayed to the user when a mouse-over or mouse click is done on the location. Thus, user is allowed to browse the content objects stored in database 110.

Figure 6:
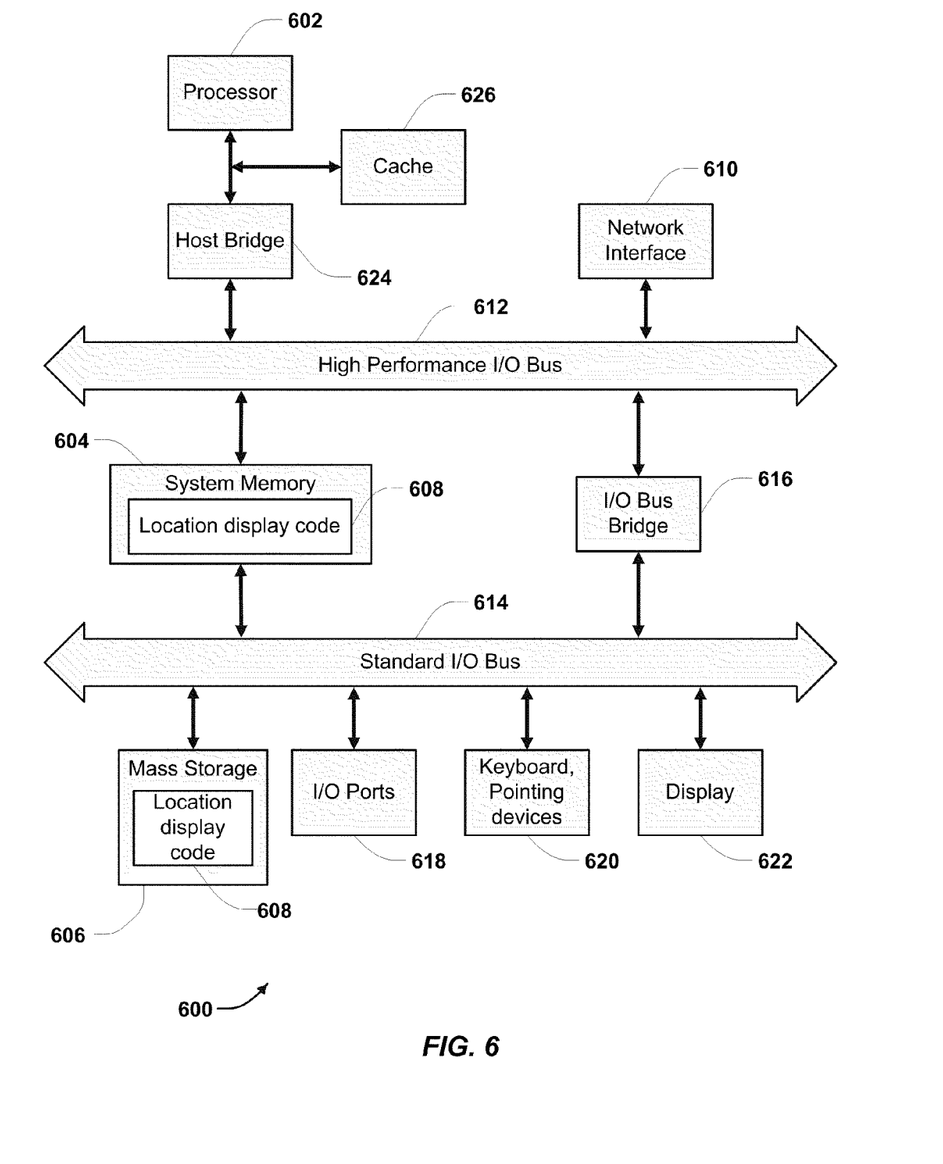
FIG. 6 is a schematic diagram illustrating an example computing system for displaying one or more geographical locations associated with the one or more annotations.

FIG. 6 illustrates an example hardware system 600 to implement the location display system according to one embodiment. Hardware system 600 includes at least one processor 602, a system memory 604, and mass storage 606. The system memory 604 has stored therein one or more application software, programming instructions for implementing location display process 608, an operating system and drivers directed to the functions described herein. Mass storage 606 provides permanent storage for the data and programming instructions for location display process 608, whereas system memory 604 (e.g., DRAM) provides temporary storage for the data and programming instructions when executed by processor 602. The process flow of the programming instructions for location display process 608 is described in detail in conjunction with FIG. 5. In one embodiment, database 110 (shown in the FIG. 1) may reside in mass storage 606. A network/communication interface 610 provides communication between hardware system 600 and any of a wide range of networks, such as an Ethernet (e.g., IEEE 802.3) network, etc. Additionally, hardware system 600 includes a high performance input/output (I/O) bus 612 and a standard I/O bus 614. System memory 604 and network/communication interface 610 couple to bus 612. Mass storage 606 couple to bus 614. I/O Bus Bridge 616 couples the two buses 612 and 614 to each other.

In one embodiment, location display process 608 described herein is implemented as a series of software routines run by hardware system 600. These software routines comprise a plurality or series of instructions to be executed by a processor in a hardware system, such as processor 602. Initially, the series of instructions are stored on a storage device, such as mass storage 606. However, the series of instructions can be stored on any suitable storage medium, such as a diskette, CD-ROM, ROM, EEPROM, DVD, Blu-ray disk, etc. Furthermore, the series of instructions need not be stored locally, and could be received from a remote storage device, such as server on a network, via network/communication interface 610. The instructions are copied from the storage device, such as mass storage 606, into system memory 604 and then accessed and executed by processor 602.

In one embodiment, hardware system 600 may also include I/O ports 618, a keyboard and pointing device 620, a display 622 coupled to bus 612. I/O ports 618 are one or more serial and/or parallel communication ports that provide communication between additional peripheral devices, which may be coupled to hardware system 600. A host bridge 624 couples processor 602 to high performance I/O bus 612. Hardware system 600 may further include video memory (not shown) and a display device coupled to the video memory. Collectively, these elements are intended to represent a broad category of computer hardware systems, including without limitation general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

Hardware system 600 may include a variety of system architectures; and various components of the hardware system 600 may be rearranged. For example, cache 626 may be on-chip with processor 602. Alternatively, cache 626 and processor 602 may be packed together as a "processor module," with processor 602 being referred to as the "processor core." Furthermore, certain embodiments of the present invention may not require nor include all of the above components. For example, the peripheral devices shown coupled to standard I/O bus 612 may couple to high performance I/O bus 612. In addition, in some embodiments only a single bus may exist with the components of hardware system 600 being coupled to the single bus. Furthermore, hardware system 600 may include additional components, such as additional processors, storage devices, or memories.

An operating system manages and controls the operation of hardware system 600, including the input and output of data to and from software applications (not shown). The operating system provides an interface between the software applications being executed on the system and the hardware components of the system. According to one embodiment of the present invention, the operating system is the LINUX operating system. However, the present invention may be used with other suitable operating systems, such as the Windows® 95/98/NT/XP/Server operating system, available from Microsoft Corporation of Redmond, Wash., the Apple Macintosh Operating System, available from Apple Computer Int. of Cupertino, Calif., UNIX operating systems, and the like.

The present invention has been explained with reference to specific embodiments. For example, while embodiments of the present invention have been described with reference to specific hardware and software components, those skilled in the art will appreciate that different combinations of hardware and/or software components may also be used, and that particular operations described as being implemented in hardware might also be implemented in software or vice versa. Other embodiments will be evident to those of ordinary skill in the art. It is therefore not intended that the present invention be limited, except as indicated by the appended claims.

The invention claimed is:

1. A method comprising:
receiving, at a computing system and transmitted from a remote client, an item of content comprising one or more first annotations;
wherein at least partially in response to the receiving of the item of content, performing:
obtaining, from a language model, electronic signals comprising probabilistic content corresponding to the one or more first annotations;
employing probabilistic modeling to identify and rank, based at least partially on relevance, two or more geographical locations associated with the one or more first annotations, wherein the probabilistic modeling is based, at least in part, on the obtained probabilistic content; and
transmitting electronic signals operative to result in the remote client displaying, over a world map:
the identified and ranked two or more geographical locations corresponding to the one or more first annotations at a first zoom level, and
visual indications of respective ranking values for individual ones of the ranked two or more geographical locations for the item of content;
wherein after the transmitting the electronic signals operative to result in the remote client displaying, over the world map, the identified and ranked two or more geographical locations, receiving one or more second annotations from the remote client and transmitting additional electronic signals operative to result in the remote client displaying, over the world map, at least one of the identified and ranked two or more geographical locations at a second zoom level different from the first zoom level.

2. The method of claim 1, wherein the one or more second annotations comprise keywords of a search query.

3. The method of claim 1, wherein the one or more second annotations include at least one of a tag, a title, a description, or a comment.

4. The method of claim 1, wherein the transmitting comprises placing the identified and ranked two or more geographical locations on grid cells displayed on the world map.

5. The method of claim 1, wherein the transmitting comprises placing the identified and ranked two or more geographical locations on bounding boxes displayed on the world map.

6. The method of claim 1, wherein the transmitting two or more geographical locations comprises highlighting the identified and ranked two or more geographical locations by providing a color code on a heat map and wherein the heat map is overlaid on the world map.

7. The method of claim 6, wherein the color code defines a ranking order of the identified and ranked two or more geographical locations.

8. The method of claim 1, wherein the visual indications of the respective ranking values for individual ones of the ranked two or more geographical locations comprise numerical rankings of the two or more geographical locations on the world map.

9. The method of claim 1, further comprising:
providing a functionality to select at least one geographical location from the identified and ranked two or more geographical locations; and
displaying a representative content object of the selected at least one geographical location;
wherein a user is capable of browsing content objects associated with the selected at least one geographical location.

10. The method of claim 9, wherein the selected at least one geographical location is selectable via a mouse-over on the selected at least one geographical location.

11. The method of claim 9, wherein the selected at least one geographical location is selectable via a mouse click on the selected at least one geographical location.

12. A system comprising:
one or more network interfaces;
at least one processor;
a memory; and
a computer readable storage medium to store computer program code executable by the at least one processor to:
process an item of content comprising one or more first annotations to be received from a remote client via the one or more network interfaces;
wherein at least partially in response to receipt of the item of content, the computer program code is further executable by the at least one processor to:
obtain, from a language model, electronic signals to comprise probabilistic content to correspond to the one or more first annotations;
employ probabilistic modeling to identify and rank two or more geographical locations to be associated with the one or more first annotations, wherein the probabilistic modeling is to be based, at least in part, on the obtained probabilistic content; and initiate transmission to result in display of the identified and ranked two or more geographical locations over a world map via the remove client and visual indications of respective ranking values for individual ones of the ranked two or more geographical locations for the item of content at a first zoom level;

wherein after the transmission to result in the display, over the world map, of the identified and ranked two or more geographical locations, process one or more second annotations to be received from the remote client and initiate transmission of electronic signals to result in the remote client displaying, over the world map, at least one of the identified and ranked two or more geographical locations at a second zoom level different from the first zoom level.

13. The system of claim 12, wherein the one or more second annotations to comprise keywords of a search query.

14. The system of claim 12, wherein the one or more second annotations to include at least one of a tag, a title, a description, or a comment.

15. The system of claim 12, wherein the initiate transmission of the identified and ranked two or more geographical locations to comprise highlight the identified and ranked two or more geographical locations by a provision of a color code on a heat map and wherein the heat map is to be overlaid on the world map.

16. The system of claim 15, wherein the color code is to define a ranking order of the identified and ranked two or more geographical locations.

17. The system of claim 12, wherein the visual indications of the respective ranking values for individual ones of the ranked two or more geographical locations to comprise numerical rankings of the two or more geographical locations on the world map.

18. A non-transitory computer readable storage medium to store computer program code executable by at least one processor to:

process an item of content to comprise one or more first annotations to be received, at a computing system, from a remote client;

wherein at least partially in response to receipt of the item of content, the computer program code is further executable by the at least one processor to:

obtain, from a language model, electronic signals to comprise probabilistic content to correspond to the one or more first annotations;

employ probabilistic modeling to identify and rank two or more geographical locations to be associated with the one or more first annotations, wherein the probabilistic modeling is to be based, at least in part, on the obtained probabilistic content; and initiate transmission to result in the remote client in display of, over a world map:

the identified and ranked one or more geographical locations to correspond to the one or more first annotations, and visual indications of respective ranking values for individual ones of the ranked two or more geographical locations for the item of content at a first zoom level;

wherein after the transmission to result in the display, over the world map, of the identified and ranked two or more geographical locations, process one or more second annotations to be received from the remote client and initiate transmission of electronic signals to result in the remote client displaying, over the world map, at least one of the identified and ranked two or more geographical locations at a second zoom level different from the first zoom level.

\* \* \* \* \*